(12) United States Patent
Srinivasan et al.

(10) Patent No.: US 11,087,747 B2
(45) Date of Patent: Aug. 10, 2021

(54) AIRCRAFT SYSTEMS AND METHODS FOR RETROSPECTIVE AUDIO ANALYSIS

(71) Applicant: HONEYWELL INTERNATIONAL INC., Morris Plains, NJ (US)

(72) Inventors: Narayanan Srinivasan, Chennai (IN); Kiran Gopala Krishna, Bangalore (IN); Gobinathan Baladhandapani, Madurai (IN); Hariharan Saptharishi, Trichy (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 251 days.

(21) Appl. No.: 16/425,799

(22) Filed: May 29, 2019

(65) Prior Publication Data
US 2020/0380958 A1 Dec. 3, 2020

(51) Int. Cl.
| | |
|---|---|
| *G06F 16/64* | (2019.01) |
| *G10L 15/18* | (2013.01) |
| *G08G 5/00* | (2006.01) |
| *G06F 16/683* | (2019.01) |
| *G06F 16/635* | (2019.01) |
| *G06F 16/65* | (2019.01) |
| *G06F 40/35* | (2020.01) |

(52) U.S. Cl.
CPC ............ *G10L 15/18* (2013.01); *G06F 16/635* (2019.01); *G06F 16/64* (2019.01); *G06F 16/65* (2019.01); *G06F 16/685* (2019.01); *G06F 40/35* (2020.01); *G08G 5/0004* (2013.01)

(58) Field of Classification Search
None
See application file for complete search history.

(56) References Cited

U.S. PATENT DOCUMENTS

| | | | |
|---|---|---|---|
| 5,251,131 A | 10/1993 | Masand et al. | |
| 7,249,015 B2 * | 7/2007 | Jiang | G10L 25/48 704/222 |
| 10,248,742 B2 | 4/2019 | Desell et al. | |
| 2006/0136466 A1 | 6/2006 | Weiner et al. | |
| 2006/0136467 A1 | 6/2006 | Avinash et al. | |
| 2007/0043565 A1 | 2/2007 | Aggarwal et al. | |
| 2008/0092168 A1 * | 4/2008 | Logan | H04N 21/4782 725/44 |
| 2008/0154595 A1 | 6/2008 | Nelken | |
| 2011/0069230 A1 * | 3/2011 | Polumbus | G06F 16/745 348/468 |
| 2013/0028174 A1 | 1/2013 | Cabos | |
| 2013/0158991 A1 * | 6/2013 | Dong | B64D 45/0051 704/235 |

(Continued)

*Primary Examiner* — Nafiz E Hoque
(74) *Attorney, Agent, or Firm* — Lorenz & Kopf, LLP (57) ABSTRACT

Vehicle systems and methods are provided for capturing audio during operation for subsequent presentation and analysis. One method involves obtaining a plurality of audio segments via an audio input device onboard an aircraft, classifying each audio segment of the plurality of audio segments into one or more of a plurality of topic categories based at least in part on the content of the respective audio segment, and providing a graphical user interface (GUI) display depicting the plurality of audio segments in a time-ordered sequence. The GUI display includes GUI elements for selectively removing subsets of audio segments classified into particular topic categories from the time-ordered sequence.

19 Claims, 5 Drawing Sheets

(56) References Cited

U.S. PATENT DOCUMENTS

| | | | |
|---|---|---|---|
| 2014/0050307 A1* | 2/2014 | Yuzefovich | H04M 15/68 |
| | | | 379/68 |
| 2016/0063999 A1* | 3/2016 | Gaston | G08G 5/0013 |
| | | | 704/235 |
| 2016/0086389 A1 | 3/2016 | Mylaraswamy et al. | |
| 2017/0287467 A1* | 10/2017 | Lafon | G08G 5/0021 |
| 2018/0205658 A1 | 7/2018 | Sullivan | |

\* cited by examiner

AIRCRAFT SYSTEMS AND METHODS FOR RETROSPECTIVE AUDIO ANALYSIS

TECHNICAL FIELD

The subject matter described herein relates generally to vehicle systems, and more particularly, embodiments of the subject matter relate to avionics systems and methods for capturing and classifying audio inputs for retrospective analysis.

BACKGROUND

Many aircraft include flight recorders, such as a flight data recorder (FDR) and/or a cockpit voice recorder (CVR). The recorded flight data and cockpit audio provide insight into operation of the aircraft for subsequent investigation and analysis. For example, a CVR generally utilizes a microphone in the cockpit to record flight crew communications and any other sounds inside the cockpit. However, in addition to capturing extraneous or irrelevant audio, the CVR data is relatively simplistic and does not independently provide insight into the operation of the aircraft beyond the recorded audio content. As such, it can be time consuming or cumbersome for a technician to retrospectively review, manually identify relevant portions of audio, and then manually relate the identified audio to FDR data or other information characterizing the aircraft operation. Accordingly, it is desirable to provide systems and methods that provide a better understanding of the cockpit audio to better facilitate retrospective analysis and improve the accuracy or reliability of the resulting conclusions regarding the operator behavior (e.g., compliance with crew resource management (CRM) procedures, protocols, policies, and the like). Other desirable features and characteristics of the methods and systems will become apparent from the subsequent detailed description and the appended claims, taken in conjunction with the accompanying drawings and the preceding background.

BRIEF SUMMARY

Vehicle systems and related methods are provided for capturing audio during vehicle operation for subsequent presentation and analysis. One exemplary method involves obtaining a plurality of audio segments via an audio input device onboard a vehicle, classifying each audio segment of the plurality of audio segments into one or more of a plurality of categories based at least in part on a content of the respective audio segment, and providing a graphical user interface display including a graphical representation of the plurality of audio segments in a time-ordered sequence, wherein the graphical user interface display includes a graphical user interface element operable to selectively remove a respective subset of the plurality of audio segments that were assigned or classified into the deselected category of the plurality of categories from the time-ordered sequence.

In another embodiment, an aircraft system is provided that includes a data storage element, an audio input device to obtain a plurality of audio segments, and a processing system coupled to the audio input device and the data storage element to assign each audio segment of the plurality of audio segments to one or more topic categories of a plurality of topic categories based at least in part on a content of the respective audio segment and create an entry for each audio segment of the plurality of audio segments in an audio log maintained in the data storage element, wherein the entry maintains an association between the content of the respective audio segment, the one or more topic categories assigned to the respective audio segment, and a timestamp associated with the respective audio segment.

In yet another embodiment, a system is provided that includes a display device, a data storage element and a processing system. The data storage element maintains a log of audio segments captured using one or more audio input devices onboard a vehicle, wherein the log includes an entry for each audio segment comprising a textual representation of the respective audio segment, a timestamp associated with the respective audio segment, and identification of one or more topic categories of a plurality of topic categories assigned to the respective audio segment. The processing system is coupled to the data storage element and the display device to provide an audio log graphical user interface (GUI) display on the display device comprising a sequential listing of the audio segments maintained in the log, wherein for each topic category of the plurality of topic categories, the audio log GUI display includes a corresponding GUI element that is selectable to selectively remove a subset of the audio segments assigned to the respective topic category from the sequential listing.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description. For purposes of explanation, the subject matter may be primarily described herein in the context of audio captured during operation of an aircraft; however, the subject matter described herein is not necessarily limited to aircraft or avionic environments, and in alternative embodiments, may be implemented in an equivalent manner for operators of other types of vehicles (e.g., automobiles or other ground-based vehicles, vessels or marine-based vehicles, etc.).

Embodiments of the subject matter described herein relate to vehicle systems and methods for capturing audio data and storing the audio data in a time ordered sequence for retrospective analysis. In exemplary embodiments, captured audio is segmented into discrete portions or segments, which, in turn, are then classified into one or more categories based on their respective audio content in real-time. For example, portions of audio recognized as emanating from a particular source (e.g., a pilot, a co-pilot, air traffic control, or the like) may be distinguished from preceding and/or subsequent portions of audio emanating from different sources. Speech-to-text conversion and natural language processing are performed on or otherwise with respect to the audio content of each discrete audio segment to determine whether the audio content corresponds to one or more different categories of operational communications or auditory events. In some embodiments, based on the classification of a respective audio segment, different types of concurrent or contemporaneous status or operational data are identified and captured in real-time for storage in association with the respective audio segment. For example, when an audio segment is classified into a navigational category, the current heading, coordinate location (e.g., latitude and longitude coordinates), altitude, speed, and/or the like associated with the vehicle may be captured and stored in association with the navigational-related audio segment. On the other hand, if an audio segment were to be classified into a weather category, the current wind speed, barometric pressure, and/or the like may be captured and stored in association with the weather-related audio segment. In this manner, audio segments are classified into different categories in real-time in a manner that allows for the relevant data characterizing the current operational status or context to be contemporaneously captured and associated with the respective audio segments.

In exemplary embodiments, the captured and classified audio segments are also timestamped to facilitate presentation of the audio segments in a time-ordered sequence. In this regard, exemplary embodiments described herein provide a graphical user interface (GUI) display that includes GUI elements that are manipulable, selectable, or otherwise operable by a user to selectively remove or add subsets of audio segments classified into a particular category from the depicted time-ordered sequence. For example, the GUI display may include a checkbox associated with navigational-related communications, with graphical representations of audio segments classified into the navigational category being depicted in the time-ordered sequence on the GUI display when the navigation checkbox is checked or selected and otherwise filtered or removed from the time-ordered sequence on the GUI display when the navigation checkbox is unchecked or deselected. Thus, the GUI display allows a user to only review audio segments classified into particular categories that are selected or otherwise desired by the user, while maintaining the time-ordered sequential presentation of the selected audio segments. Additionally, the contemporaneous operational or contextual data associated with the audio segments classified into the selected categories may also be presented or depicted in a manner that allows the user to review the relevant data contemporaneous to the respective audio segments. For example, during a retrospective analysis of a flight by an aircraft, a technician interested in reviewing solely the navigation-related audio segments may be presented with a GUI display that solely lists the navigation-related communications in a time-ordered sequence along with the contemporaneous heading, coordinate location, altitude, speed, and/or the like pertinent to the respective communications, thereby allowing the technician to more effectively reconstruct and diagnose a particular situation encountered during the preceding operation of the aircraft.

Figure 1:
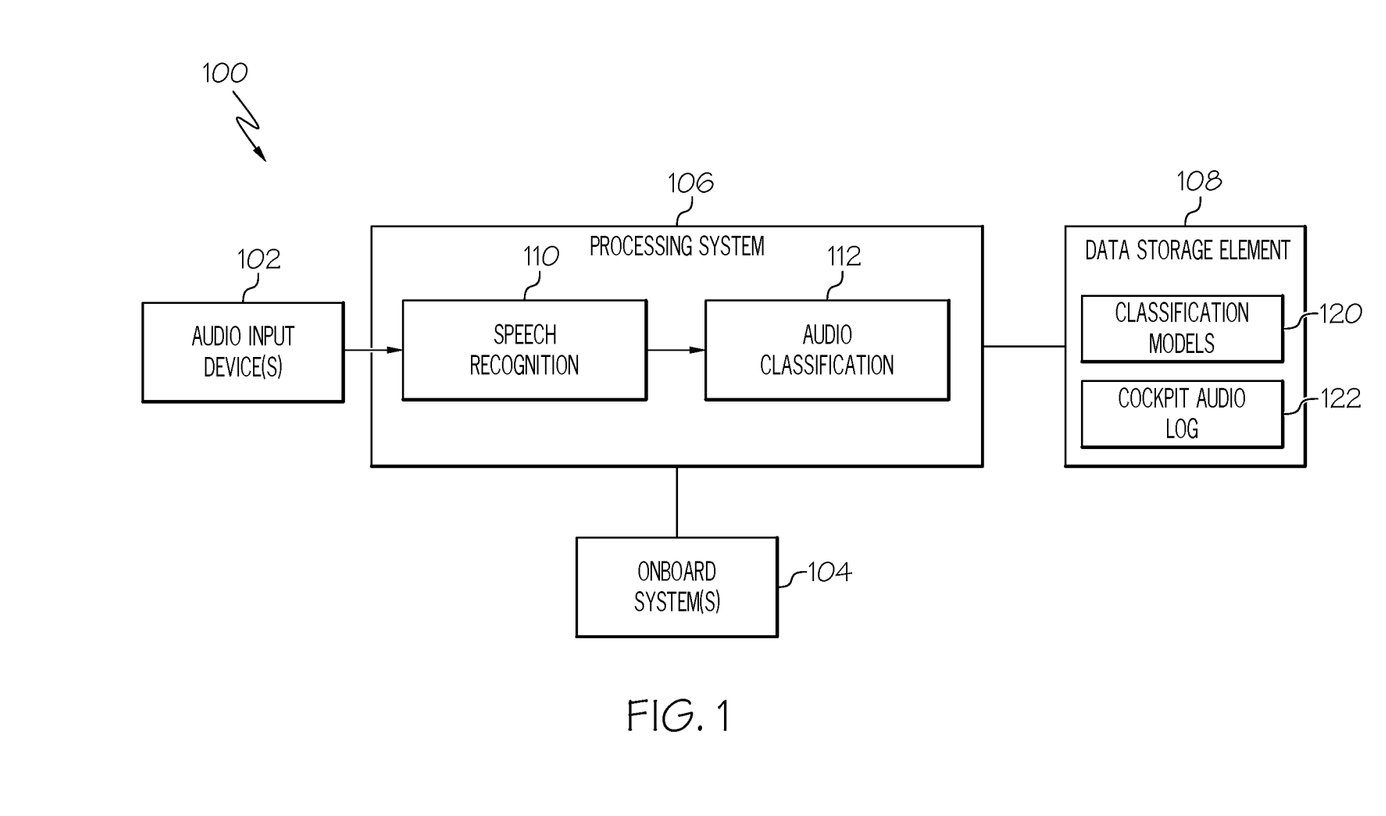
FIG. 1 is a block diagram illustrating a system suitable for use onboard a vehicle such as an aircraft in accordance with one or more exemplary embodiments.

FIG. 1 depicts an exemplary embodiment of a system 100 suitable for use with a vehicle, such as an aircraft. The illustrated vehicle system 100 includes, without limitation, one or more audio input devices 102, one or more vehicle systems 104, a processing system 106, and a data storage element 108. It should be appreciated that FIG. 1 depicts a simplified representation of a vehicle system 100 for purposes of explanation and is not intended to limit the subject matter in any way. For example, in a dual operator or dual pilot configuration of the system 100, there may be one audio input device 102 associated with a captain or pilot in command and another audio input device 102 associated with a first officer, co-pilot, or other pilot monitoring operation of the vehicle. However, other embodiments of the vehicle system 100 could include additional sets of audio input devices for supporting additional crew members, while in yet other embodiments, one or more audio input devices may be shared or utilized by more than vehicle operator.

The audio input devices 102 generally represent one or more headsets, microphones, audio transducers, audio sensors, or other device that allows for audio input to be received or otherwise provided to the processing system 106. In this regard, in some embodiments, the audio input devices 102 may be configured to allow a pilot, co-pilot, or other operator to command, control, or otherwise interact with an onboard system 104 in a "hands free" manner without requiring the user to move his or her hands, eyes and/or head to interact with the system 104. In other embodiments, one or more audio input device 102 may be configured to capture ambient audio within the cockpit or elsewhere onboard the aircraft independent of a pilot or co-pilot. In this regard, depending on the embodiment, the audio input device(s) 102 may be configured to capture crew communications, communications with air traffic control or other ground personnel, automated briefings (e.g., automated radio weather briefings), auditory alerts or warnings, or other ambient sounds that are recognizable as corresponding to an operational event, such as, landing gear extension and/or retraction, engine noises, and/or the like.

The onboard vehicle systems 104 generally represent any sort of electrical, mechanical, hydraulic, pneumatic, environmental, or propulsion systems configured to facilitate or otherwise support one or more aspects of operation of a vehicle. For example, in the case of an aircraft, the onboard vehicle systems 104 could include or otherwise be realized as any one or more of the following: a flight management system (FMS), a communications system, a navigational system, a weather system, an air traffic management system, a radar system, a traffic avoidance system, an autopilot system, an autothrust system, a landing gear system, a flight control system, hydraulics systems, pneumatics systems, environmental systems, electrical systems, engine systems, trim systems, lighting systems, crew alerting systems, electronic checklist systems, a heads-up display (HUD) or other display system(s), a ground proximity warning system, a yoke stick control system, an electronic flight bag and/or any other avionics system. A given onboard vehicle system 104 may support any number of different operating modes or control functions, and/or may operate in accordance with any number of parameters or settings that may be adjusted or configured to influence the operation or functionality of the respective system 104.

The processing system 106 generally represents the hardware, software, and/or firmware components (or a combination thereof), which is communicatively coupled to the various elements of the vehicle system 100 and configured to perform additional tasks and/or functions to support the audio recording process 200 of FIG. 2, as described in greater detail below. Depending on the embodiment, the processing system 106 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration.

In practice, the processing system 106 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in the illustrated embodiment, the processing system 106 includes or otherwise accesses a data storage element (e.g., data storage element 108) storing code or other computer-executable programming instructions that, when read and executed by the processing system 106, cause the processing system 106 to generate, implement, or otherwise execute a speech recognition application 110 that supports transcribing, decoding, or otherwise converting audio segments into corresponding textual representations, as described in greater detail below. Additionally, in the illustrated embodiment, the processing system 106 generates, implements, or otherwise executes an audio classification application 112 that analyzes the textual representations of audio segments provided by the speech recognition application 110, classifies the audio segments into appropriate categories based on the text or content thereof, and supports or otherwise performs additional tasks, operations, functions, and/or processes described herein.

The data storage element 108 (or memory) generally represents any sort of non-transitory short- or long-term storage media. Depending on the embodiment, the data storage element 108 may include or otherwise be physically realized using random access memory (RAM), read only memory (ROM), flash memory, registers, a hard disk, or another suitable data storage medium known in the art or any suitable combination thereof. Moreover, in some embodiments, the data storage element 108 may be realized as a database or some other remote data storage or device that is communicatively coupled to the processing system 106 via a communications network. In exemplary embodiments, the data storage element 108 stores or otherwise maintains a set of natural language processing models utilized by the audio classification application 112 to classify or categorize audio segments, alternatively referred to herein as classification models 120. The data storage element 108 may also store or maintain additional rules, requirements, or other procedures or protocols for communications (e.g., callout rules or similar protocols that dictate communications sequences) that may be utilized in conjunction with the classification models 120 for deriving the subject, intent, or objective of a particular communication. In the illustrated embodiment, the data storage element 108 is also utilized to maintain a cockpit audio log 124 for maintaining the sequence of recorded audio segments captured by the audio input device(s) 102 along with the corresponding categorization(s) and contemporaneous data associated with the respective audio segments, as described in greater detail below. In this regard, the data storage element 108 and/or the cockpit audio log 124 may be realized as a part or component of a cockpit voice recorder (CVR), a flight data recorder (FDR), or other data recording system associated with the aircraft.

Figure 2:
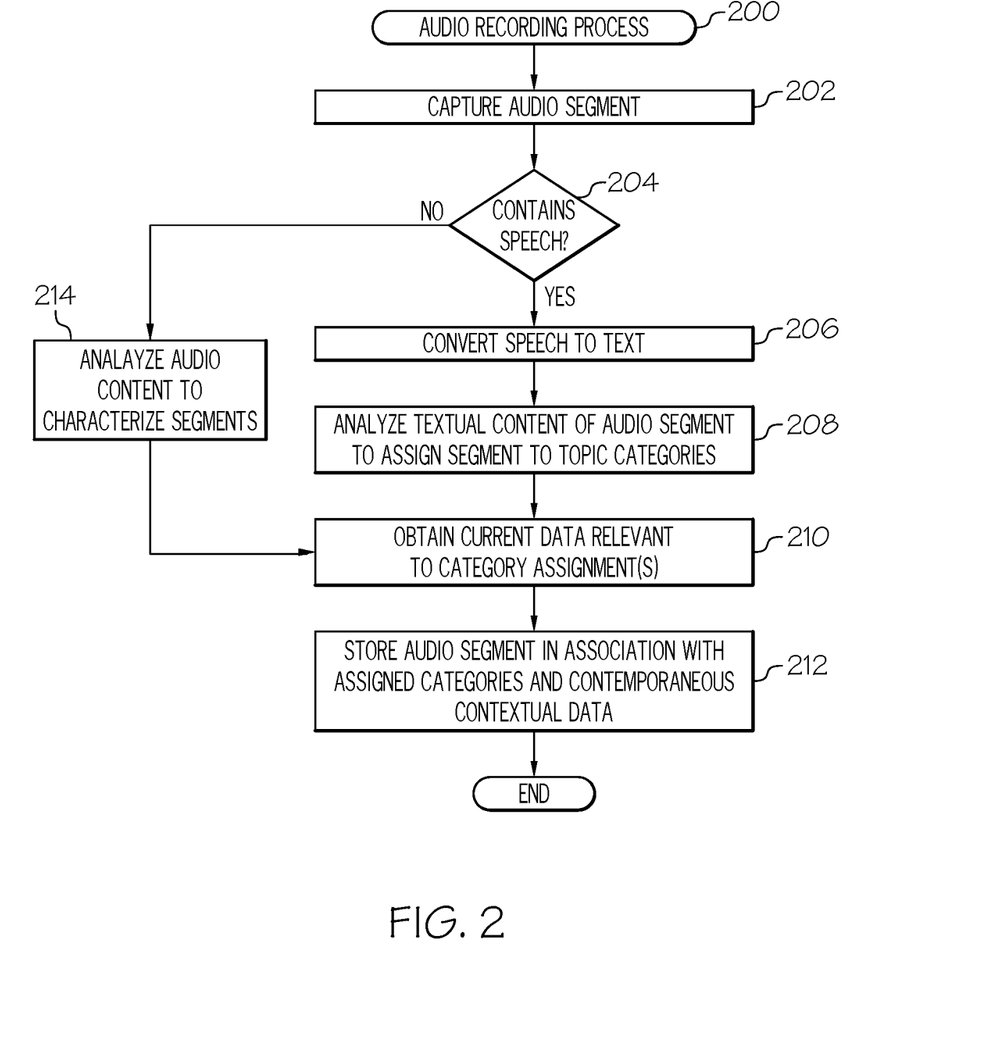
FIG. 2 is a flow diagram illustrating an audio recording process suitable for implementation in the aircraft system of FIG. 1 in accordance with one or more exemplary embodiments.

FIG. 2 depicts an exemplary embodiment of an audio recording process 200 suitable for use in a vehicle system, such as the aircraft system 100 of FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the audio recording process 200 may be performed by different elements of the system 100, such as, for example, the processing system 106, the speech recognition application 110, the audio classification application 112 and/or the data storage element 108. It should be appreciated that the audio recording process 200 may include any number of additional or alternative tasks, the tasks need not be performed in the illustrated order and/or the tasks may be performed concurrently, and/or the audio recording process 200 may be incorporated into a more comprehensive procedure or process having additional functionality not described in detail herein. Moreover, one or more of the tasks shown and described in the context of FIG. 2 could be omitted from a practical embodiment of the audio recording process 200 as long as the intended overall functionality remains intact.

Referring to FIG. 2 with continued reference to FIG. 1, in exemplary embodiments, the audio recording process 200 initializes by obtaining or otherwise capturing an audio segment for analysis and potential recording (task 202). In this regard, the processing system 106 and/or the speech recognition application 110 may continually monitor the output of the audio input device(s) 102 to detect or otherwise identify when a non-negligible audio signal is captured. For example, the processing system 106 and/or the speech recognition application 110 may apply one or more filters to the audio signal output by the audio input device(s) 102 to filter out ambient background noise and then detect or otherwise identify when the resulting filtered audio signal level is greater than a detection threshold. Thereafter, the processing system 106 and/or the speech recognition application 110 may capture or otherwise record the filtered audio signal for the duration of time that elapses until falling below the detection threshold for a duration of time that indicates a discontinuity or logical break between audio segments. In some embodiments, the captured audio segment may be further divided among different sources when audio emanating from different sources is detected. For example, when crosstalk exists or is otherwise detected, the processing system 106 and/or the speech recognition application 110 may utilize voice recognition or similar techniques to attribute different portions of the captured audio to different speakers or sources. In other embodiments, the various channels for audio communications may be split or separated from one another (e.g., an Automatic Terminal Information Service (ATIS) voice channel may be separate from channels used for air traffic control (ATC) communications), thereby allowing the processing system 106 to isolate and identify which channel the audio is received from, and thereby, determine the source of the audio.

In the illustrated embodiment, the audio recording process 200 identifies or otherwise determines whether the content of the captured audio segment includes speech, and if so, transcribes or otherwise converts the speech content of the captured audio segment to a corresponding textual representation (tasks 204, 206). In this regard, the processing system 106 and/or the speech recognition application 110 parses, analyzes, or otherwise processes the captured audio signal to transcribe or otherwise convert the speech content into a corresponding textual representation. Thereafter, the audio recording process 200 analyses the textual content for the captured audio segment to assign the captured audio segment to one or more topic categories (task 208). For example, the audio classification application 112 performs natural language processing one or more of the classification models 120 ascertain the topic(s) or subject(s) of the communication and then assign the audio segment to the appropriate topic category (e.g., based on particular keywords recognized or otherwise identified within a communication). In this regard, in some embodiments, audio classification application 112 utilizes the classification models 120 in conjunction with one or more preceding audio segments to determine what the speech contained in the audio segment pertains to. In one or more exemplary embodiments, when the audio classification application 112 fails to assign a category to a captured audio segment, the captured audio segment is discarded and the audio recording process 200 exits or terminates with respect to that segment. That said, in other embodiments, when the audio classification application 112 fails to assign a category to a captured audio segment, the captured audio segment may be assigned to an uncategorized or miscellaneous category.

In an exemplary embodiment, the audio classification application 112 classifies each communication into one or more of the following topic categories: a weather-related category, a navigation-related category, an aircraft performance-related category, and/or a system warning category. In this regard, depending on the content of the captured audio segment, the audio classification application 112 may assign more than one category to the captured audio segment. Additionally, in various embodiments, lower level subcategories may be defined underneath a top-level category. For example, audio segments classified into the aircraft performance-related category may be further classified into subcategories such as a mechanical event category or a maintenance-related category. In this regard, the subject matter described herein is not intended to be limited to any particular classification scheme or hierarchy.

After assigning the captured audio segment to one or more topic categories, in exemplary embodiments, the audio recording process 200 continues by capturing or otherwise obtaining contemporaneous operational or status data likely to be relevant based on the assigned topic category (task 210). For example, for an audio segment assigned to the navigation-related category, the processing system 106 may retrieve, capture or otherwise obtain current navigational data from one or more onboard systems 104, such as, for example, the current heading of the aircraft, the current aircraft location (e.g., latitude and longitude coordinates), the current aircraft altitude, the current speed of the aircraft, and the like. Similarly, for an audio segment assigned to the weather-related category, the processing system 106 may retrieve or otherwise obtain current meteorological data from one or more onboard systems 104, such as, for example, the current barometric pressure, the current temperature, the current wind speed, the current wind direction, and/or the like. Likewise, for an audio segment assigned to the performance-related category, the processing system 106 may retrieve or otherwise obtain data characterizing the current operational condition or status of the aircraft, such as, for example, the current operating status of the engines, the current revolutions per minute for the engines, the current landing gear position, the current flap positions, the current state or status for one or more onboard systems 104, and/or the like. For audio segments assigned to multiple categories, the processing system 106 obtains contemporaneous data pertaining to each of the assigned categories (e.g., both navigation data and meteorological data for an audio segment assigned to both the navigation and weather categories). It should be noted that the contemporaneous data captured by the audio recording process 200 characterizes the aircraft status or operational context during which a respective communication occurred, thereby better facilitating retrospective reconstruction and analysis of the communication.

After obtaining data relevant to the assigned topic categories, the audio recording process 200 stores or otherwise maintains the captured audio segment in association with its assigned topic categories and contemporaneous data (task 212). For example, the processing system 106 may create a new entry in the cockpit audio log 122 that includes a timestamp associated with the captured audio segment, the textual representation of the audio content of the captured audio segment, identification of the one or more topic categories assigned to the captured audio segment, and the contemporaneous data relevant to the assigned topic(s). In this regard, it should be noted that in some embodiments, the natural language processing algorithms implemented by the audio classification application 112 may utilize one or more previous entries in the cockpit audio log 122 and their assigned topic categories and/or associated contextual data in conjunction with the classification models 120 when assigning subsequent audio segments to topic categories. For example, if a preceding communication from a pilot was assigned to a particular category, a subsequent response from the co-pilot that is logically or temporally related to the preceding communication may be assigned to the same category based on the sequence or context surrounding the communications, even though the co-pilot communication may lack keywords that would otherwise trigger classification into that category.

In exemplary embodiments, the audio recording process 200 continually repeats throughout operation of the aircraft to continually update the cockpit audio log 122 in real-time in response to captured audio segments that are assigned to one or more topic categories of interest. In this regard, in exemplary embodiments, when the audio recording process 200 detects or otherwise identifies an audio segment that does not contain speech, the audio recording process 200 assigns the captured audio segment to a cockpit sound category. In one or more embodiments, the audio recording process 200 analyzes the non-speech audio content of the captured audio segment to characterize the content of the audio segment (task 214). In this manner, some embodiments may classify or assign the captured audio segment based on the audio analysis. After filtering out ambient background noise, the processing system 106 and/or the audio classification application 112 may analyze one or more signal characteristics of the non-speech audio content and thereby recognize the captured audio segment as corresponding to a particular type of event based on the signal characteristic(s). For example, the filtered non-speech audio signal contained in a captured audio segment may be recognized as corresponding to an engine failure, a bird strike, or other mechanical event having a distinguishable sound. In this regard, a recognized event assigned to the captured audio segment may function as a subcategory beneath a top-level cockpit sound category. Similar to the captured audio segments including speech, the audio recording process 200 captures or otherwise obtains contemporaneous operational or status data relevant to the cockpit sound category and/or the assigned event type before storing the characterization of the captured audio segment in association with the category assignment(s) and the relevant contemporaneous data (tasks 210, 212). For example, a warning from a ground proximity warning system (GPWS) or a runway awareness and advisory system (RAAS) may be captured and assigned to one or more categories (e.g., navigation and system warnings) while also capturing operational or status data contemporaneous to those warnings (e.g., the contemporaneous aircraft location and altitude, heading, etc.).

Figure 3:
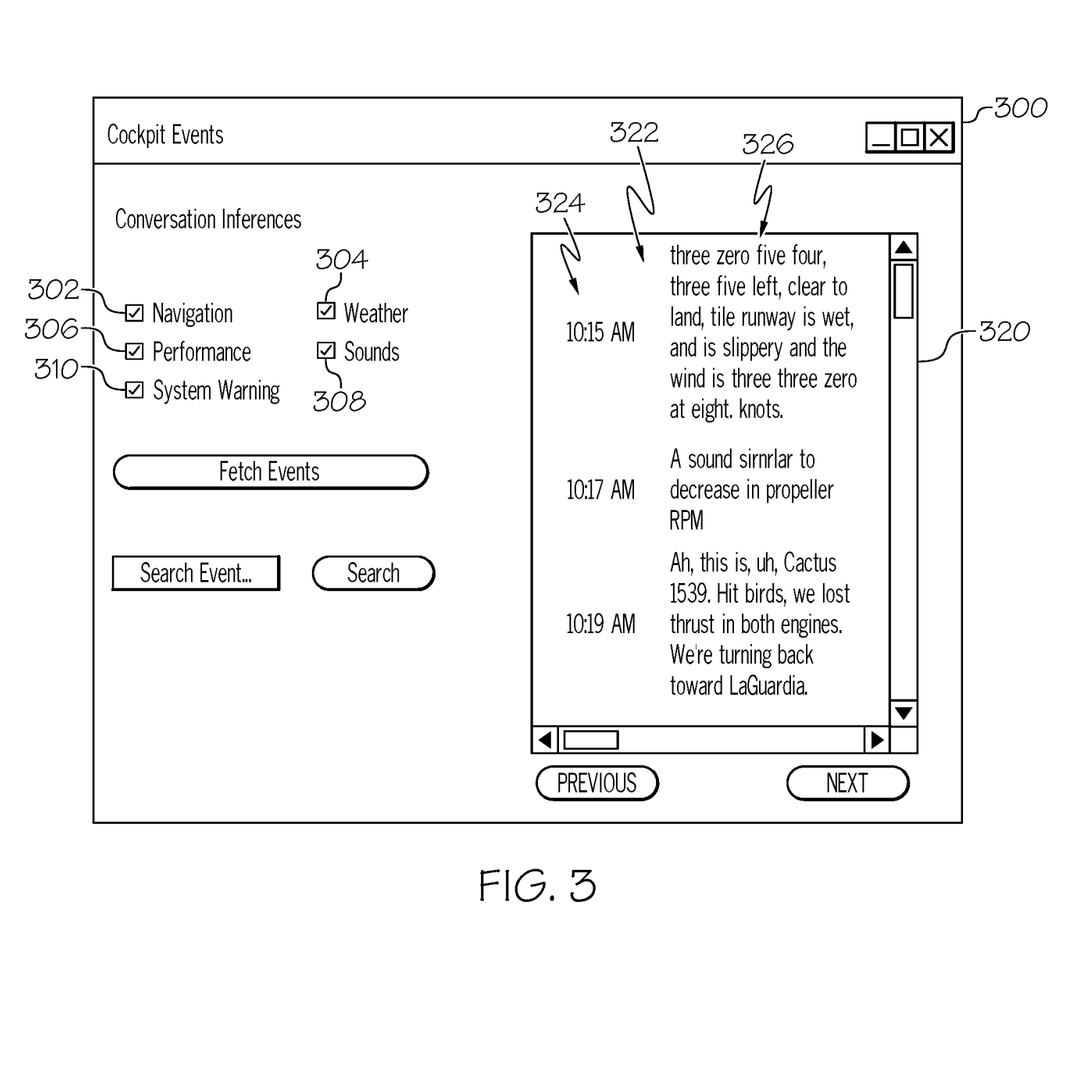
FIGS. 3-4 depict an exemplary sequence of graphical user interface (GUI) displays that may be presented on a display device in connection with an exemplary embodiment of the audio recording process of FIG. 2.
Figure 4:
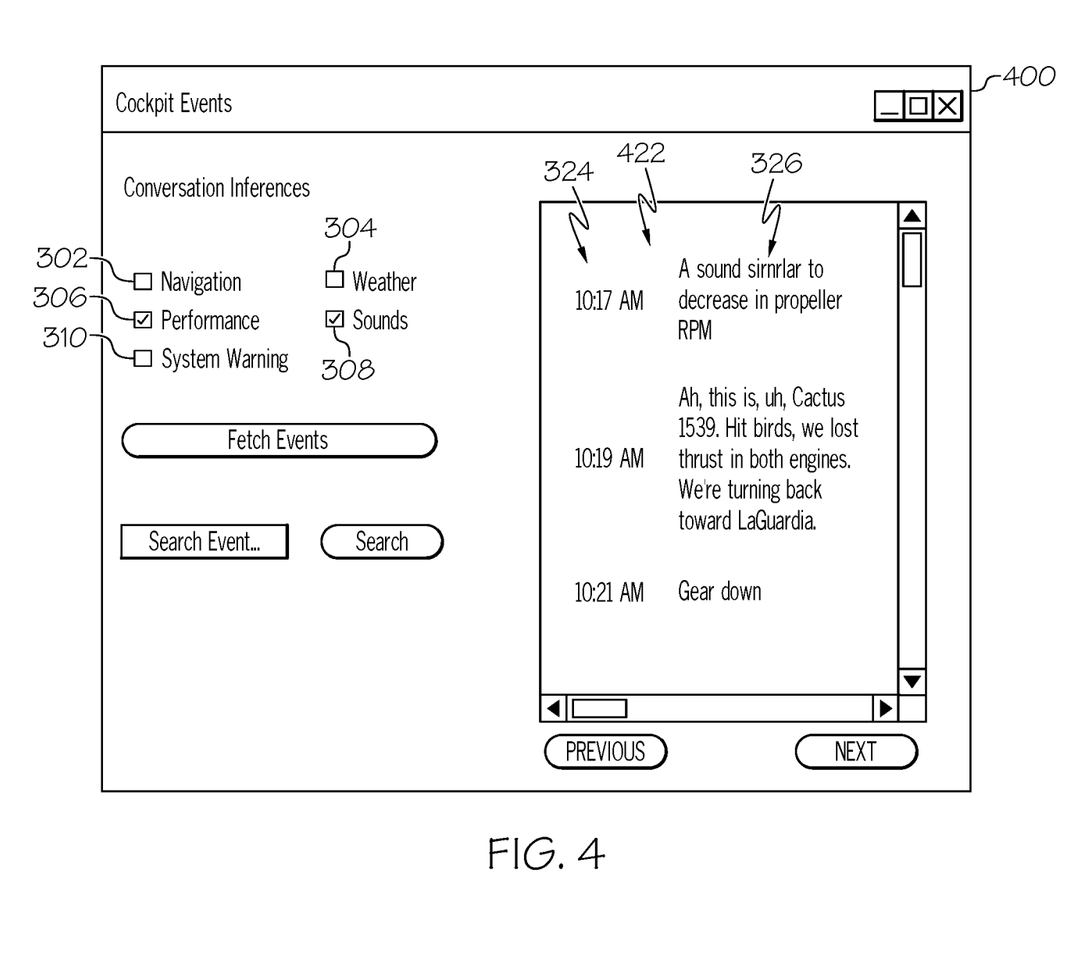

FIGS. 3-4 depict a sequence of audio log GUI displays 300, 400 that may be presented by or on a computing device in connection with the audio recording process 200 of FIG. 2. In this regard, the computing device may be realized as any sort of electronic device capable of receiving the cockpit audio log data 122 either directly or indirectly from the data storage element 108. For example, the computing device may be capable of downloading the cockpit audio log data 122 from the data storage element 108 and/or the system 100 via a communications network or using a cable or wired interface to the data storage element 108 and/or the system 100. The computing device may generally include a processing system and a data storage element that stores code or other computer-executable programming instructions that, when read and executed by the processing system, cause the processing system to generate or otherwise provide an application that supports reviewing and analyzing the data obtained from the data storage element 108 or a recording system containing the data storage element 108 (e.g., a CVR, a FDR, or the like). The computing device may also include or otherwise be communicatively coupled to a display device that allows the processing system to generate or otherwise provide audio log GUI displays 300, 400 including graphical representations of the captured audio segments, as described herein.

In exemplary embodiments, the audio log GUI displays 300, 400 include a list box or similar GUI element 320 that defines a scrollable region 322 of the audio log GUI display 300, 400 for depicting a time-ordered sequential listing of graphical representations of the captured audio segments. In this regard, each row of information depicted in the list region 322 may correspond to a discrete audio segmented captured and recorded in connection with the audio recording process 200. In exemplary embodiments, the scrollable region 322 includes a first column 324 depicting the timestamp associated with a respective captured audio segment along with a second column 326 depicting the transcribed or characterized content of the respective captured audio segment. Although not illustrated in FIGS. 3-4, other embodiments may include additional columns for depicting the categories assigned to the respective captured audio segment, contemporaneous data associated with the respective captured audio segment, and/or the like.

The audio log GUI displays 300, 400 also include GUI elements 302, 304, 306, 308, 310 (e.g., checkboxes or the like) associated with the various topic categories that are selectable or otherwise manipulable to selectively add or remove captured audio segments assigned to the respective topic categories from presentation on the audio log GUI display 300, 400. In this regard, FIG. 3 depicts an embodiment of an audio log GUI display 300 where all of the topic category GUI elements 302, 304, 306, 308, 310 are selected or otherwise enabled, such that the resulting audio log GUI display 300 includes a sequential listing of all captured audio segments that were assigned to at least one of the navigation, weather, performance, system warning, or cockpit sound topic categories.

Referring to FIG. 4, a technician retrospectively reviewing a flight that involved a bird strike may interact with the GUI elements 302, 304, 306, 308, 310 to filter audio segments from the list region 322. For example, the technician may deselect or otherwise deactivate the navigation, weather, and system warning checkboxes 302, 304, 310 while selecting or otherwise activating the performance and cockpit sound checkboxes 306, 308 to focus the review on solely those audio segments the technician believes are most likely to be relevant to the bird strike event. In response to deselecting checkboxes 302, 304, 310, the list region 322 is dynamically updated to provide an updated filtered list region 422 that includes only captured audio segments assigned to the performance or cockpit sound categories. In this regard, captured audio segments pertaining solely to one of the navigation, weather, or system warning categories are removed from the updated list region 422. The updated audio log GUI display 400 depicts a non-speech captured audio segment characterized as a decrease in propeller revolutions per minute having a timestamp of 10:17 AM and assigned to the cockpit sound category, followed by a captured audio segment having a timestamp of 10:19 AM that was transcribed and classified as a performance-related communication using natural language processing (e.g., based on references to engines and thrust in connection with the preceding cockpit sound audio segment). By filtering communications the technician believes to be extraneous (e.g., navigation, weather, and system warning) with respect to the situation being analyzed (e.g., a bird strike), the technician may quickly identify relevant audio segments and glean information from them, for example, by diagnosing the bird strike as having occurred at 10:17 AM based on the captured sound segment, determining it took the pilot and/or co-pilot 2 minutes to recognize the bird strike based on the difference in timestamps between the captured sound segment and the subsequent communication, and the like.

Figure 5:
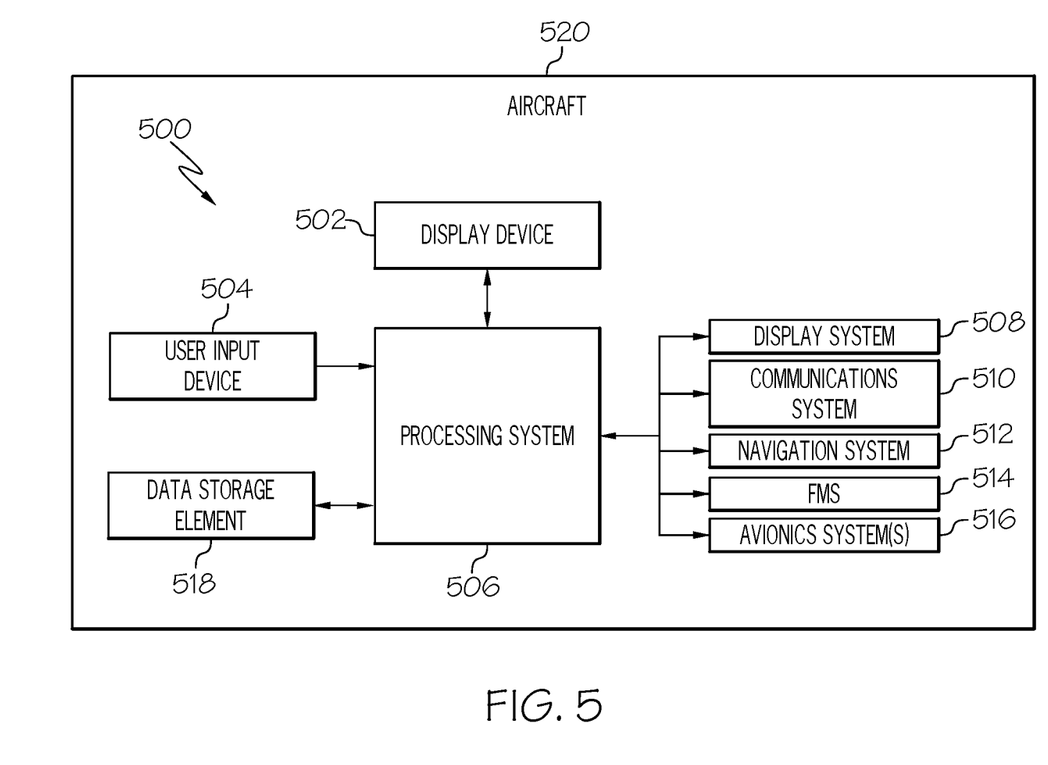
FIG. 5 is a block diagram illustrating an aircraft system suitable for implementing the audio recording process of FIG. 2 in accordance with one or more exemplary embodiments.

FIG. 5 depicts an exemplary embodiment of an aircraft system 500 suitable for implementing the audio recording process 200 and the related subject matter described herein. The illustrated aircraft system 500 includes, without limitation, a display device 502, one or more user input devices 504, a processing system 506, a display system 508, a communications system 510, a navigation system 512, a flight management system (FMS) 514, one or more avionics systems 516, and a data storage element 518 suitably configured to support operation of the system 500.

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device(s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device (e.g., audio input device 102), such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the aircraft system 500 and perform additional tasks and/or functions to support the audio recording process 200 of FIG. 2 during operation of the aircraft system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the aircraft system 500, as described herein. Furthermore, the steps of a method or algorithm described in connection with the embodiments disclosed herein may be embodied directly in hardware, in firmware, in a software module executed by the processing system 506, or in any practical combination thereof. For example, in one or more embodiments, the processing system 506 includes or otherwise accesses a data storage element (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, functions, and/or processes described herein.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, a terrain database, an obstacle database, a navigational database, a geopolitical database, a terminal airspace database, a special use airspace database, or other information for rendering and/or displaying navigational maps and/or other content on the display device 502.

In exemplary embodiments, the aircraft system 500 includes a data storage element 518, which contains aircraft procedure information (or instrument procedure information) for a plurality of airports and maintains association between the aircraft procedure information and the corresponding airports. Depending on the embodiment, the data storage element 518 may be physically realized using RAM memory, ROM memory, flash memory, registers, a hard disk, or another suitable data storage medium known in the art or any suitable combination thereof. The aircraft procedure information may be provided by or otherwise obtained from a governmental or regulatory organization, such as, for example, the Federal Aviation Administration in the United States. Similarly, in exemplary embodiments described herein, the data storage element 518 also maintains callout rules or procedures, which in some embodiments may be prescribed or provided by a governmental or regulatory organization.

Still referring to FIG. 5, in an exemplary embodiment, the processing system 506 is coupled to the navigation system 512, which is configured to provide real-time navigational data and/or information regarding operation of the aircraft 520. The navigation system 512 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506. Although FIG. 5 depicts a single avionics system 516, in practice, the aircraft system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the aircraft system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. As described above, in various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516, and the current operational context may be stored or maintained in association with captured audio segments.

It should be understood that FIG. 5 is a simplified representation of the aircraft system 500 for purposes of explanation and ease of description, and FIG. 5 is not intended to limit the application or scope of the subject matter described herein in any way. It should be appreciated that although FIG. 5 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the aircraft system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the aircraft system 500 and/or aircraft 520 will include numerous other devices and components for providing additional functions and features, as will be appreciated in the art. In this regard, it will be appreciated that although FIG. 5 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

For the sake of brevity, conventional techniques related to data recorders, accident reconstruction, audio processing, speech recognition, natural language processing, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method comprising:
    obtaining a plurality of audio segments via an audio input device onboard a vehicle;
    classifying each audio segment of the plurality of audio segments into one or more of a plurality of categories based at least in part on a content of the respective audio segment;
    obtaining, for each respective audio segment of the plurality of audio segments, contemporaneous data from one or more systems onboard the vehicle;
    storing the contemporaneous data for each respective audio segment of the plurality of audio segments in association with the respective audio segment; and providing a graphical user interface display including a graphical representation of the plurality of audio segments in a time-ordered sequence, wherein the graphical user interface display includes a graphical user interface element operable to selectively remove a respective subset of the plurality of audio segments classified into a first category of the plurality of categories from the time-ordered sequence.

2. The method of claim 1, wherein:
obtaining the plurality of audio segments comprises obtaining a respective textual representation of each respective audio segment of the plurality of audio segments; and
classifying each audio segment comprises classifying each respective audio segment into the respective one or more of the plurality of categories based at least in part on the content of the respective textual representation of the respective audio segment.

3. The method of claim 2, wherein classifying each respective audio segment comprises performing natural language processing on the respective textual representation of the respective audio segment to identify a topic associated with the respective audio segment.

4. The method of claim 1, further comprising identifying, for each respective audio segment of the plurality of audio segments, a relevant subset of operational data based on the one or more of the plurality of categories assigned to the respective audio segment, wherein obtaining the contemporaneous data comprises obtaining current values for the relevant subset of operational data for the respective audio segment.

5. The method of claim 1, wherein providing the graphical user interface display comprises providing a scrollable region including a sequential listing of the plurality of audio segments.

6. The method of claim 5, wherein the scrollable region includes a first column depicting a respective timestamp assigned to a respective audio segment of the plurality of audio segments and a second column depicting the content of the respective audio segment.

7. The method of claim 6, further comprising dynamically removing the respective subset of one or more audio segments classified into the first category from the scrollable region in response to deselection of the graphical user interface element.

8. The method of claim 1, wherein the vehicle comprises an aircraft and the plurality of audio segments correspond to communications by one or more pilots onboard the aircraft.

9. The method of claim 8, further comprising storing, in a cockpit voice recorder, each audio segment of the plurality of audio segments in association with the respective one or more of the plurality of categories the respective audio segment is classified into.

10. The method of claim 1, wherein obtaining the contemporaneous data comprises obtaining current values for a relevant subset of operational data for the respective audio segment.

11. An aircraft system comprising:
a data storage element;
an audio input device to obtain a plurality of audio segments;
one or more onboard systems to obtain data pertaining to aircraft operation; and
a processing system coupled to the one or more onboard systems, the audio input device and the data storage element to assign each audio segment of the plurality of audio segments to one or more topic categories of a plurality of topic categories based at least in part on a content of the respective audio segment, create an entry for each audio segment of the plurality of audio segments in an audio log maintained in the data storage element, obtain one or more values for a subset of the data contemporaneous to each audio segment of the plurality of audio segments, and store the one or more values in the entry for the respective audio segment, wherein the entry maintains an association between the content of the respective audio segment, the one or more topic categories assigned to the respective audio segment, and a timestamp associated with the respective audio segment.

12. The aircraft system of claim 11, further comprising a display device, wherein the processing system is coupled to the display device to provide a graphical user interface display including graphical representations of the plurality of audio segments in a time-ordered sequence in accordance with the audio log, wherein the graphical user interface display includes one or more graphical user interface elements operable to selectively remove a respective subset of the plurality of audio segments classified into a respective topic category of the plurality of topic categories from the time-ordered sequence.

13. The aircraft system of claim 11, wherein:
the processing system is configured to convert audio content of each audio segment of the plurality of audio segments into a corresponding textual representation and assign each audio segment of the plurality of audio segments to the one or more topic categories based at least in part on the textual representation of the respective audio segment; and
the entry maintains the association between the textual representation of the respective audio segment, the one or more topic categories assigned to the respective audio segment, and the timestamp associated with the respective audio segment.

14. The aircraft system of claim 13, wherein the data storage element maintains one or more classification models and the processing system performs natural language processing on the textual representation of the respective audio segment using the one or more classification models to identify the one or more topic categories to be assigned to the respective audio segment.

15. The aircraft system of claim 11, wherein the data storage element comprises at least one of a cockpit voice recorder (CVR) and a flight data recorder (FDR).

16. A system comprising:
a display device;
a data storage element to maintain a log of audio segments captured using one or more audio input devices onboard a vehicle, wherein the log includes an entry for each audio segment comprising a textual representation of the respective audio segment, a timestamp associated with the respective audio segment, contemporaneous data obtained from one or more systems onboard the vehicle and identification of one or more topic categories of a plurality of topic categories assigned to the respective audio segment; and
a processing system coupled to the data storage element and the display device to provide an audio log graphical user interface (GUI) display on the display device comprising a sequential listing of the audio segments maintained in the log, wherein for each topic category of the plurality of topic categories, the audio log GUI display includes a corresponding GUI element that is selectable to selectively remove a subset of the audio segments assigned to the respective topic category from the sequential listing.

17. The system of claim 16, wherein the sequential listing comprises a first column depicting the timestamp associated with the respective audio segment and a second column depicting the textual representation of the respective audio segment.

18. The system of claim 16, wherein the data storage element comprises a cockpit voice recorder (CVR) or a flight data recorder (FDR).

19. The system of claim 16, wherein the vehicle comprises an aircraft and the audio segments comprise communications by one or more pilots onboard the aircraft.

\* \* \* \* \*